United States Patent
Chunduru Venkata et al.

(10) Patent No.: US 11,683,240 B2
(45) Date of Patent: *Jun. 20, 2023

(54) INTELLIGENT AND ASSISTED INTENT BUILDER

(71) Applicant: Verizon Patent and Licensing Inc., Basking Ridge, NJ (US)

(72) Inventors: Sivanaga Ravi Kumar Chunduru Venkata, Irving, TX (US); Raju Sharma, Raleigh, NC (US); Manish Srivastava, Frisco, TX (US); Raghu Rami Reddy Valisammagari, Murphy, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,364

(22) Filed: Sep. 10, 2021

(65) Prior Publication Data
US 2021/0409287 A1 Dec. 30, 2021

Related U.S. Application Data

(63) Continuation of application No. 16/849,022, filed on Apr. 15, 2020, now Pat. No. 11,153,180.

(51) Int. Cl.
*H04L 41/22* (2022.01)
*H04L 41/12* (2022.01)
(Continued)

(52) U.S. Cl.
CPC .......... *H04L 41/22* (2013.01); *H04L 41/0853* (2013.01); *H04L 41/0866* (2013.01);
(Continued)

(58) Field of Classification Search
CPC . H04L 41/22; H04L 41/0853; H04L 41/0866; H04L 41/0893; H04L 41/0894;
(Continued)

(56) References Cited

U.S. PATENT DOCUMENTS

| 7,890,870 B1 | 2/2011 | Metters et al. |
| 2013/0110856 A1* | 5/2013 | Ota .................. G06F 16/90328 707/E17.014 |

(Continued)

OTHER PUBLICATIONS

Kathiravelu, et al., "An Expressive Simulator for Dynamic Network Flows", 2015 IEEE International Conference on Cloud Engineering, 2015, pp. 311-316, doi: 10.1109/IC2E.2015.43.

*Primary Examiner* — Austin J Moreau
*Assistant Examiner* — Chhian (Amy) Ling

(57) ABSTRACT

Systems and methods described herein provide a network tool that discovers device configurations for selected enterprise sites and automatically organizes the data to assist users, so they can build intents for network function policies in enterprise networks. An intent builder performs device discovery of network function (NF) instances in a customer network; retrieves configuration elements from the NF instances; normalizes the configuration elements; and generates a graphical user interface with rule paths based on the configuration elements. The network device receives, via the graphical user interface, user input to map source Internet protocol (IP) addresses in the rule paths to a user label and to map destination IP address in the rule paths to an application label. Based on the user input, the network device presents, via the graphical user interface, consolidated intents and generates vendor-agnostic policy rules from the consolidated intents.

20 Claims, 13 Drawing Sheets

(51) Int. Cl.
  *H04L 41/0866* (2022.01)
  *H04L 41/0893* (2022.01)
  *H04L 41/0853* (2022.01)
  *H04L 61/4541* (2022.01)
  *H04L 41/0895* (2022.01)
  *H04L 41/40* (2022.01)
  *H04L 41/0894* (2022.01)

(52) U.S. Cl.
  CPC ...... *H04L 41/0893* (2013.01); *H04L 41/0894* (2022.05); *H04L 41/0895* (2022.05); *H04L 41/12* (2013.01); *H04L 41/40* (2022.05); *H04L 61/4541* (2022.05)

(58) Field of Classification Search
  CPC ..... H04L 41/0895; H04L 41/12; H04L 41/40; H04L 61/4541
  See application file for complete search history.

(56) References Cited

U.S. PATENT DOCUMENTS

| | | |
|---|---|---|
| 2013/0232275 A1 | 9/2013 | Beres |
| 2015/0309561 A1* | 10/2015 | Stewart .................. G06F 3/01 345/156 |
| 2016/0080502 A1* | 3/2016 | Yadav .................. H04L 45/02 709/227 |
| 2016/0373303 A1 | 12/2016 | Vedam et al. |
| 2017/0230425 A1 | 8/2017 | Knjazihhin et al. |
| 2019/0108561 A1 | 4/2019 | Shivashankar et al. |
| 2019/0238410 A1* | 8/2019 | Kang ................. H04L 41/0895 |
| 2020/0177550 A1* | 6/2020 | Valluri ............... H04L 41/0895 |
| 2020/0204489 A1 | 6/2020 | Pianigiani et al. |
| 2020/0275255 A1 | 8/2020 | Wang et al. |
| 2020/0296139 A1* | 9/2020 | Fainberg ............... H04L 63/205 |

* cited by examiner

FIG. 8B

INTELLIGENT AND ASSISTED INTENT BUILDER

CROSS-REFERENCE TO RELATED APPLICATION

This application is a continuation of U.S. patent application Ser. No. 16/849,022, now U.S. Pat. No. 11,153,180, filed on Apr. 15, 2020, and titled "Intelligent and Assisted Intent Builder," the contents of which are incorporated herein by reference.

BACKGROUND

Service providers are using software-defined wide area network (SD-WAN) technology to give enterprise customers more flexible, open, cloud-based WAN services, rather than installing proprietary or specialized WAN technology that often involves expensive fixed circuits or proprietary hardware. In an enterprise setup, a customer may have multiple sites/branches and data centers. Every site and data center typically has a SD-WAN device deployed either as a physical or a virtual network function (VNF). Similarly, each site and/or data center may use separate firewall policies and other WAN settings.

BRIEF DESCRIPTION OF THE DRAWINGS

FIGS. 8A and 8B are exemplary user interfaces that may correspond to the communications of FIG. 7;

DETAILED DESCRIPTION OF THE EXAMPLE EMBODIMENTS

Figure 1:
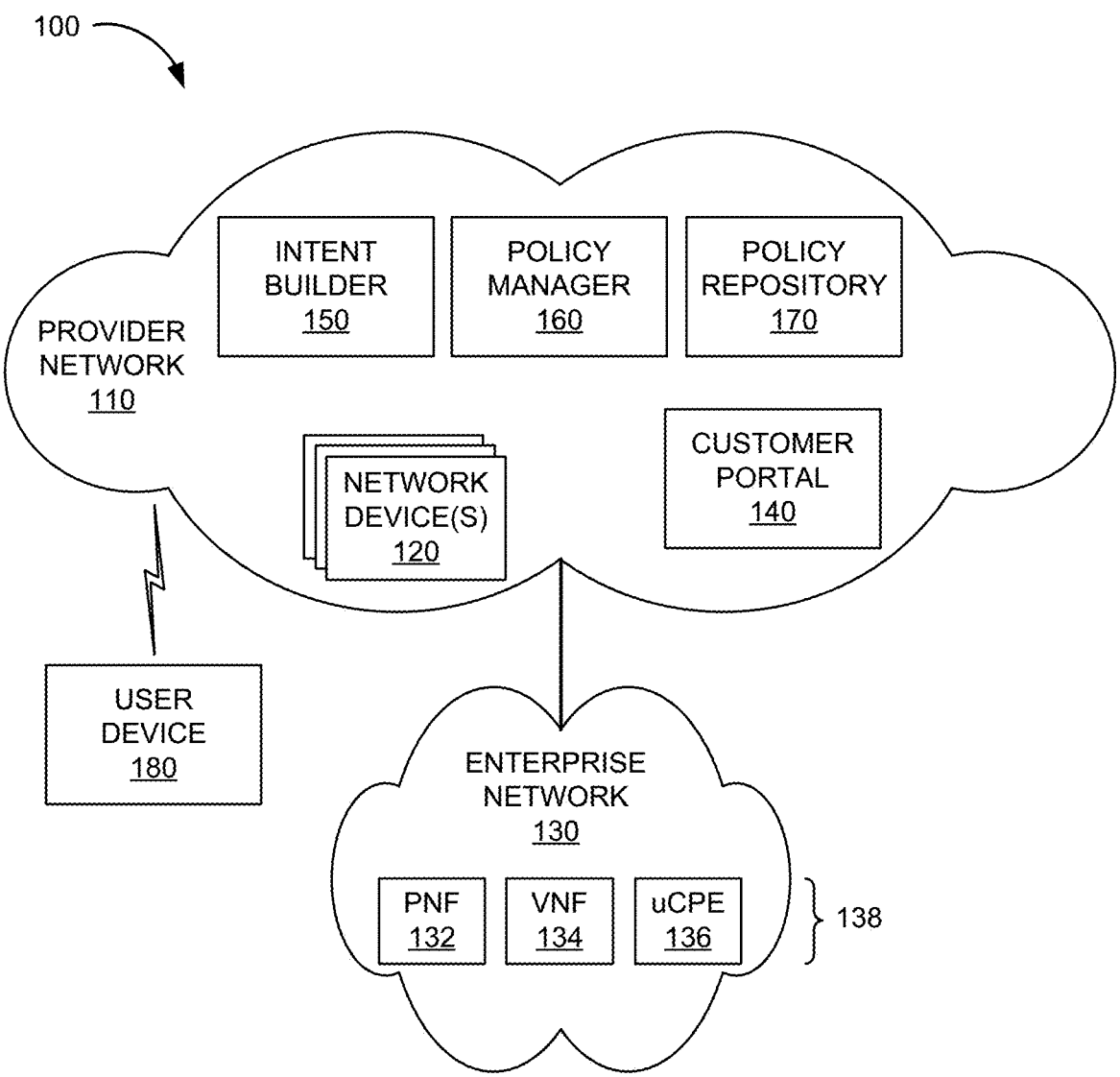
FIG. 1 is a diagram illustrating a network environment according to an implementation described herein.

The following detailed description refers to the accompanying drawings. The same reference numbers in different drawings may identify the same or similar elements.

Policy configuration and management can be intricate and time-consuming, given the ever-increasing number of applications, user-types, sites, and devices proliferating throughout an enterprise. For example, policies may apply to different combinations of user groups (e.g., accounting, human resources, marketing, etc.), applications (e.g., social media, voice-over-IP, video streaming, enterprise resource planning, etc.), and/or network functions (e.g., firewalls, routing, SD-WAN, etc.). The different network functions may also be provided by different vendors with overlapping functionality. Furthermore, these different combinations of user groups, applications, and network functions may be spread across different sites of an enterprise (such as headquarters, branch offices, data centers, and virtual connectivity platforms).

For example, a challenge of previous policy configuration using an SD-WAN, is that policies typically have to be configured per device. Policy configuration is generally driven by a vendor-provided element manager or a VNF manager (VNFM). When a network service provider (such as a broadband Internet service provider) sells SD-WAN services from various vendors, a single abstraction layer should be presented for the different vendor implementations so that customers can have one experience, with seamless migration from one vendor to the other.

Network service providers have previously provided a solution to enable customers to maintain one policy that is applicable across all the customer's SD-WAN deployments covering all the variations that are possible at each site. These solutions enable users to configure network policies (e.g., firewall policies, SD-WAN policies, optical WAN policies, etc.) using vendor-agnostic labels. The labels help to abstract low level details, such as an Internet protocol (IP) address for users or an IP address and port for applications. Thus, the labels may be used to define user intents. User intents (also referred to herein as "intents") indicate what the user wants to do, or an expression that indicates an expected final state or service state to be produced and maintained. The labels are used by a policy manager to intelligently derive the needed policies at each site.

However, to read each device configuration and build intents out of them is a mundane and tedious task. There remains a need for an automated process that can discover existing device configurations and automatically prepare intents. Thus, systems and methods described herein provide a portal (e.g., a web-based portal) that discovers all the device configurations for selected enterprise sites and automatically organizes the data to assist users, so they can build intents from the raw data (e.g., configuration data collected from the devices).

The portal may automatically identify the re-usability of discovered data entries across the enterprise sites to guide the possible policy intent. With assisted steps, users can create a set of policy intents. After successful validation, the intents can be pushed to a policy manager, thus, handing over the manual policy management of each SD-WAN device for that customer to an Intent-Based Policy Management system. The Intent-Based Policy Management system includes a graphical user interface in which a user may interactively indicate policy for use of network resources included in a customer network. Thus, systems and methods described herein may provide the ability to more easily provision and manage the complexities of "brownfield" networks (e.g., hybrid networks that combine new technology with legacy systems).

FIG. 1 is a diagram of an exemplary environment 100 in which the systems and/or methods, described herein, may be implemented. As shown in FIG. 1, environment 100 may include a provider network 110 with network devices 120 that provide services to an enterprise network 130. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Provider network 110 may generally include one or more wired, wireless and/or optical networks that are capable of receiving and transmitting data, voice and/or video signals, including multi-media signals that may include voice, data and video information. For example, provider network 110 may include one or more access networks, IP multimedia subsystem (IMS) networks, evolved packet core (EPC) networks, or other networks. The access network may include one or more wireless networks and may include a number of transmission towers for receiving wireless signals and forwarding the wireless signals toward the intended destinations. The access network may include a wireless communications network that connects users/subscribers (e.g., using user device 180) to other portions of provider network 110 (e.g., the EPC network). In one example, the access network may include a long-term evolution (LTE) network. In other implementations, the access network may employ other cellular broadband network standards such as 3rd Generation Partnership Project (3GPP) Fifth Generation (5G) and future standards. Provider network 110 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data. In an exemplary implementation, provider network 110 may represent a network associated with a service provider that provides various services, such as Internet-protocol (IP) related services, value added services, etc.

Network device 120 may include a device configured to perform network functions in provider network 110. For example, network device 120 may include a switch, a router, a firewall, a gateway, a Network Address Translation (NAT) device, a Reconfigurable Optical Add-Drop Multiplexer (ROADM), and/or another type of network device. Some or all of the functionality of network device 120 may be virtualized as a VNF in provider network 110. Depending on the implementation of network 110, network 110 may include various types of network devices 120, such as, for example, a base station (e.g., an evolved NodeB, a next-generation NodeB, etc.), a gateway device, a support node, a serving node, a mobility management entity (MME), a core access and mobility management function (AMF), a session management function (SMF), a policy control function (PCF), a policy charging rules function (PCRF), as well other network devices that provide various network-related functions and/or services, such as charging and billing, security, authentication and authorization, network policy enforcement, management of subscriber profiles, and/or other functions and/or services that facilitate the operation of the core network. Network devices 120 may receive, store, and enforce policies for end devices in enterprise network 130 (e.g., network function (NF) instances 138, described below) and other user devices (e.g., user device 180).

Enterprise network 130 (also referred to herein as a "customer network") may include a network that receives services from provider network 110. Enterprise network 130 may include a local area network (LAN), a WAN, or a combination of networks that provide network access to devices in provider network 110. In one implementation, enterprise network 130 may include a network interconnecting one or more physical network functions (PNF) 132, virtual network functions (VNF) 134, and/or universal customer premises equipment (uCPE) 136 (referred to collectively herein as "NF instances 138"). In another implementation, enterprise network 130 may include one or more application servers for user devices 180 (e.g., machine-type communication (MTC) devices, mobile devices, etc.). The application servers may, for example, receive and process data from user devices 180. In another implementation, enterprise network 130 may include one or more gateway (GW) routers (e.g., customer premises equipment) that act as a secure gateway for devices within enterprise network 130. According to some aspects, enterprise network 130 may include multiple different brownfield sites.

According to implementations describe herein, provider network 110 may also include a customer portal 140, an intent builder 150, a policy manager 160, and a policy repository 170 for an intelligent programmable policies service.

Customer portal 140 may include one or more network devices to that provide a web-based interface for a customer (e.g., using user device 180) to access intent-based policy management services. Customer portal 140, according to one implementation, may include a network device that provides an intent building assistant and SD-WAN policy management services. Users (e.g., customers) of the provider network 110 may manage (e.g., introduce, configure, issue commands, update, monitor, etc.) policies for users, applications and network functions associated with enterprise network 130 via user device 180, for example. In contrast with current SD-WAN practices where each vendor has its own customer portal, customer portal 140 may provide a unified view of all the vendor VNF implementations available through provider network 110.

According to another implementation, customer portal 140 may provide access to services facilitated through intent builder 150. Intent builder 150 may interactively initiate device discovery, normalize device data (e.g., provide a uniform presentation of configuration elements from different types of devices), and build intents for enterprise WAN policies. As an example, a graphical user interface may indicate a list of available network sites from which the user may select. Additionally, or alternatively, the graphical user interface may allow the user to express an intent using rule paths based on automated discovery of configuration elements for each NF instance in enterprise network 130 (or any portion thereof). According to an implementation, the rule paths (also referred to herein as "path flows") may include a graphical representation of source address nodes and destination nodes, interconnected by different configuration elements, for which a user can assign intents.

Intent builder 150 may include a network device or computing device that forms policy definitions and enables creation of custom policy definitions based on user input (e.g., via user device 180). As described further herein, intent builder 150 may discover device and/or NF function configurations in enterprise network 130, normalize the configurations from multiple sources, and provide intent building assistance for customers to generate and update intents for policies.

Policy manager 160 may include a network device or computing device that receives intents from intent builder 150 and applies analytics to generate policies for enforcement at particular enterprise sites. Policy manager 160 may contain the algorithms and workflows for policy management. Policy manager 160 may analyze application analytic data, a state of an application, and a policy to be administered to determine viability. For valid policies, policy manager 160 may create directions for policy enforcement (e.g., by network devices 120).

Policy repository 170 may include a database or another type of storage for custom and recommended policies by customers/site. In one implementation, policy repository 170 may include separate storage for abstract micro-service (e.g., policy) templates that are not related to any specific customer or vendor, vendor-agnostic micro-service templates that are related to a specific customer, and vendor-specific micro-services (e.g., related to a specific customer and vendor). The abstract micro-service templates may be cloned and made available to customers for applying customer-specific labels, creating vendor-agnostic micro-service templates for a particular customer. As described herein, the vendor-agnostic micro-service templates may be converted into vendor-specific micro-services for use by the customer.

User device 180 may include a computational or communication device that is capable of communicating with provider network 110. In one aspect, user device 180 may be used by an operator (e.g., a network administrator) to communicate with network devices 120, intent builder 150, policy manager 160 and/or policy repository 170. In another aspect, user device 180 may enable a customer to access customer portal 140 or interact with devices in enterprise network 130. User device 180 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

According to implementations described herein, provider network 110 (e.g., intent builder 150) may read device configurations for devices in enterprise network 130, generate path flows for intents, and present a graphical user interface (e.g., via portal 140) to allow operators to assign intents by assigning labels. The labels help to abstract low level details, such as an Internet protocol (IP) address for users or an IP address and port for applications. Intent builder 150 may generate a vendor-agnostic micro-service template using the labels and the abstract micro-service template. Upon approval, policy manager 160 may convert, based on the descriptive information, the vendor-agnostic micro-service template into a vendor-specific micro-service template for the customer and generate a network policy for enforcement across multiple sites of the customer network.

Figure 2:
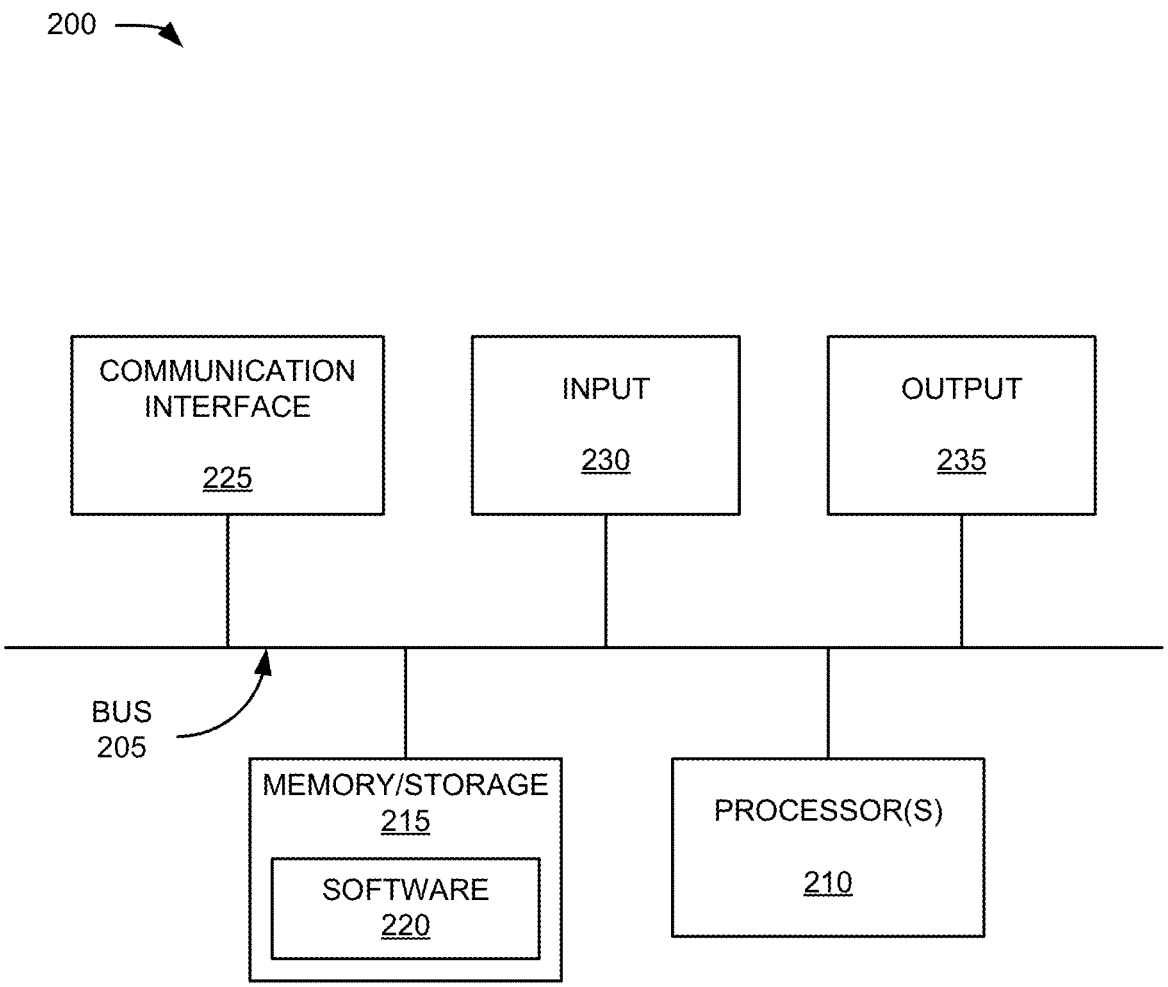
FIG. 2 is a diagram of exemplary components that may be included in one or more of the devices shown in FIG. 1.

FIG. 2 is a diagram illustrating exemplary components of a device 200 that may correspond to one or more of the devices described herein. For example, device 200 may correspond to components included in network device 120, NF instance 138, customer portal 140, intent builder 150, policy manager 160, and user device 180. As illustrated in FIG. 2, according to an exemplary embodiment, device 200 includes a bus 205, one or more processors 210, memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may be a dedicated component or a non-dedicated component (e.g., a shared resource).

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include a drive for reading from and writing to the storage medium.

Memory/storage 215 may be external to and/or removable from device 200, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 may include an operating system. Software 220 is also intended to include firmware, middleware, microcode, hardware description language (HDL), and/or other forms of instruction. For example, according to an implementation, software 220 may implement portions of customer portal 140.

Communication interface 225 permits device 200 to communicate with other devices, networks, systems, devices, and/or the like. Communication interface 225 includes one or multiple wireless interfaces and/or wired interfaces. For example, communication interface 225 may include one or multiple transmitters and receivers, or transceivers. Communication interface 225 may include one or more antennas. For example, communication interface 225 may include an array of antennas. Communication interface 225 may operate according to a protocol stack and a communication standard. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
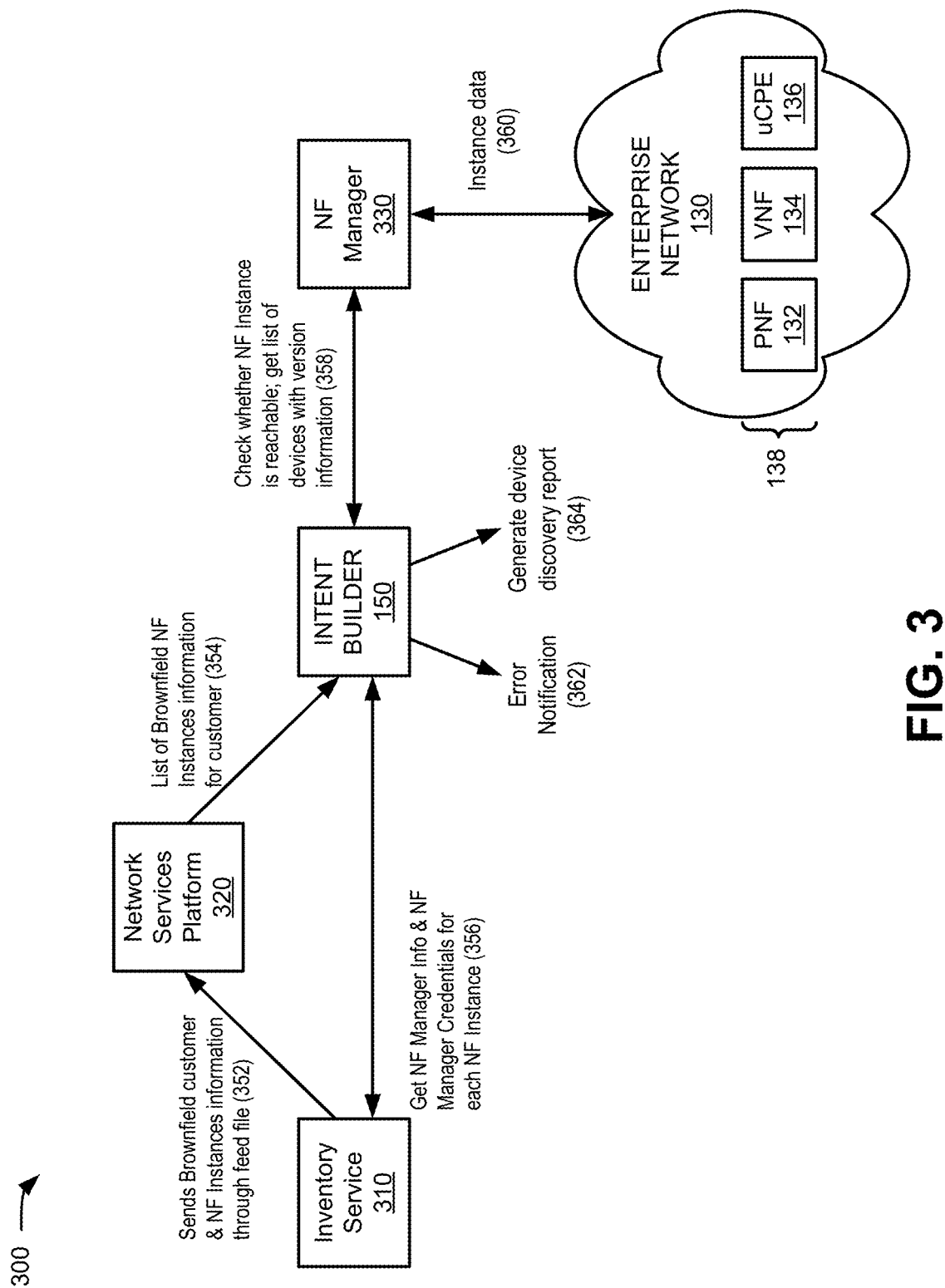
FIG. 3 is a diagram illustrating exemplary communications for implementing device discovery for network functions in an enterprise network.

FIG. 3 is a diagram illustrating exemplary communications for performing device discovery in a portion 300 of network environment 100. As shown in FIG. 3, network portion 300 may include intent builder 150, an inventory service 310, a network services platform 320, NF manager 330, and enterprise network 130. Inventory service 310, network services platform 320, and NF manager 330 may correspond to one or more of network devices 120.

Inventory Service 310 may include one or more network devices that include a database of all physical and virtual network functions supported by provider network 130. Network services platform 320 may include one or more network devices that sort NF instance information by customer. NF manager 330 may include an orchestrator or other type of control device for virtualized services in enterprise network 130. NF manager 330 may include, for example, a network function virtualization orchestrator (NFVO), a virtual network function manager (VNFM), and/or another type of network device. According to different implementations, network portion 300 may include multiple NF managers 330, such as an NF managers 300 for each of multiple sites in enterprise network 130.

Communications in FIG. 3 generally represent communications to confirm provider network records match current NF instances 138 and that provider network 110 (e.g., intent builder 150) can communicate with NF instances 138. FIG. 3 may provide simplified illustrations of communications in network portion 300 and is not intended to reflect every signal or communication exchanged between devices/functions. As shown at reference 352, inventory service 310 may send brownfield NF instance information to network services portal 330. For example, inventory service 310 may send information via a feed file whenever available NFs are added or changed. At reference 354, intent builder 150 may receive from network services platform 320 a list of brownfield NF instances for a particular customer.

As shown at reference 356, intent builder 150 may obtain NF manager information and NF manager credentials for each NF instance associated with a particular customer in list 354 (e.g., for enterprise network 130). For example, intent builder 150 may retrieve a primary and secondary network address for NF manager 330 and appropriate certificates/tokens to facilitate communications.

Intent builder 150 may use the NF manager information and NF manager credentials from inventory service 310 to verify one or more of NF instances 138. For example, as shown at reference 358, intent builder 150 may instruct NF manager 330 to check whether an NF instance 138 is reachable. In response, at reference 360, NF manager 330 may collect instance data for each NF instance 138, and provide a list of devices/functions with version information to intent builder 150.

Upon receiving data from NF manager 330 (e.g., reference 358), intent builder 150 may check whether vendor specific micro-service support (e.g., a particular NF driver) exists for a particular NF instance category and NF instance version reported by NF manager 330. If support for a particular NF instance does not exist, intent builder 150 may generate an error notification (e.g., for distribution to an error messaging pipeline, not shown), as indicated at reference 362. Similarly, if NF manager 330 reports it is not able to reach a particular NF instance, intent builder 150 may generate an error notification.

For valid NF instances and NF Manager details, intent builder 150 may generate a device discovery report, as indicated at reference 364. According to an implementation, intent builder 150 may store the device discovery report. Additionally, or alternatively, intent builder 150 may send a notification to a messaging pipeline (not shown) to indicate device discovery is complete.

Figure 4:
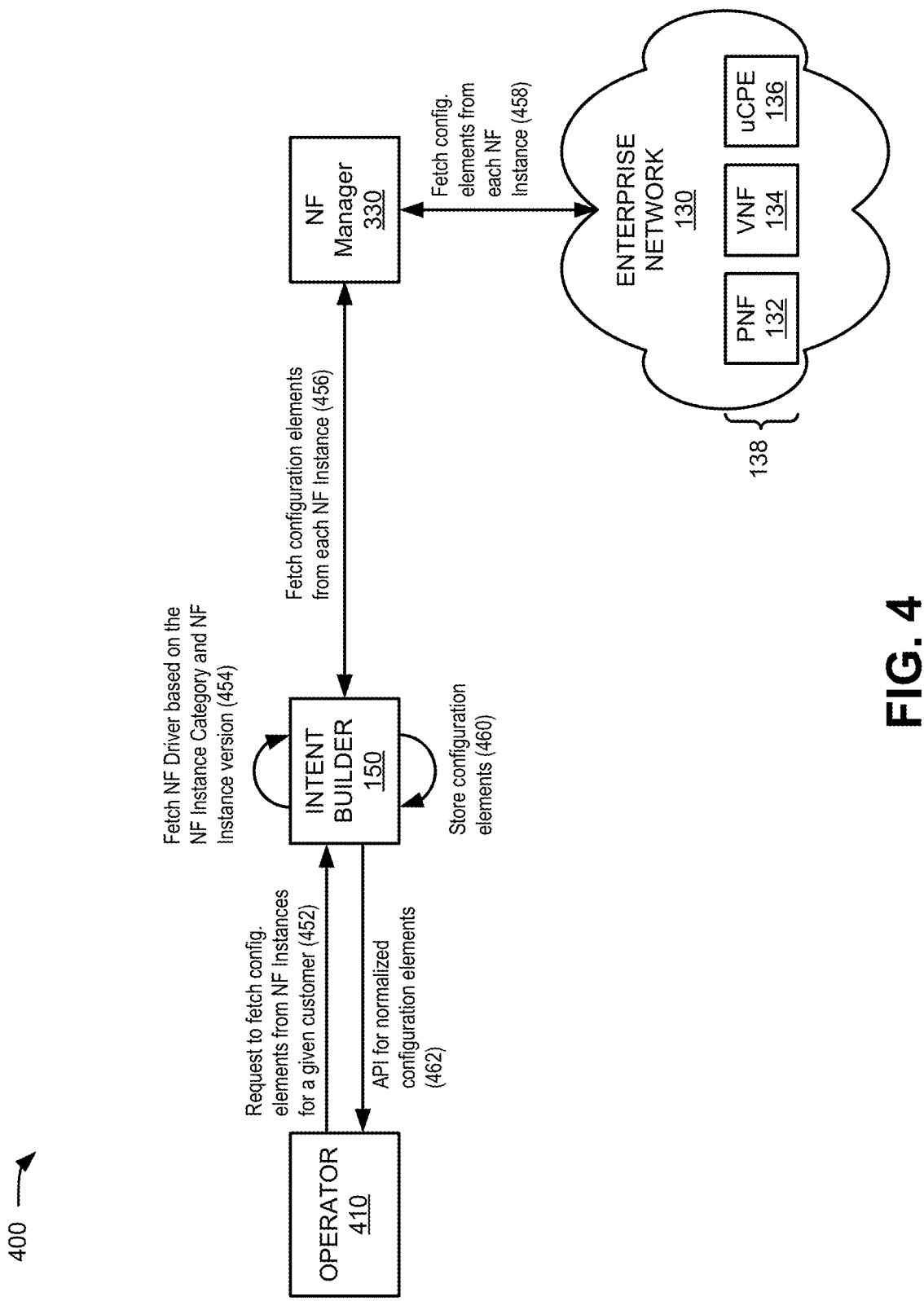
FIG. 4 is a diagram illustrating exemplary communications for normalizing configuration of network functions in the enterprise network, according to an implementation described herein.

FIG. 4 is a diagram illustrating exemplary communications for performing configuration normalization in a portion 400 of network environment 100. As shown in FIG. 4, network portion 400 may include an operator 410, intent builder 150, NF manager 330, and enterprise network 130. Operator 410 may include, for example, a registered user (e.g., a network administrator for provider network 110) using user device 180.

Communications in FIG. 4 generally represent communications to ensure different configurations of NF instances 138 are represented using a common construct. FIG. 4 may provide simplified illustrations of communications in network portion 400 and is not intended to reflect every signal or communication exchanged between devices/functions. As shown at reference 452, operator 410 (e.g., using user device 180) may provide a request to fetch configuration information for NF instances (e.g., NF instances 138) for a particular customer. As shown at reference 454, intent builder 150 may extract, from request 452, an originator's identifier (ID), also referred to as a tenant ID, and fetch an NF driver based on the category and version associated with the NF instances in request 452. For example, intent builder 150 may extract the information from the device discovery report 364 generated in FIG. 3.

As shown at reference 456, intent builder 150 may also fetch configuration elements from each of the NF instances via NF manager 330. For example, intent builder 150 may request configuration elements, such as an application aware routing (AAR) profile, quality of service (QOS), schedule, and/or policy rules for each of NF instances (e.g., associated with the tenant ID) by invoking an NF manager application programming interface (API). NF manager 330 may execute the fetch requests, as indicated at reference 458, to retrieve the configuration elements and provide the configuration elements to intent builder 150.

Intent builder 150 may receive the configuration elements and store 460 the configuration elements. For example, intent builder 150 may locally store data entries discovered across multiple sites of enterprise network 130. Additionally, or alternatively, intent builder 150 may direct storage to a database, such as policy repository 170. As indicated at reference 462, intent builder 150 may provide (e.g., to operator 410) an API to provide configuration elements in a normalized format. For example, intent builder 150 may return a structured interface format to allow a uniform presentation of configuration elements (e.g., including policy rules) for the particular customer or tenant ID associated with operator 410. According to an implementation using SD-WAN data, for example, configuration elements may be grouped by virtual private network (VPN), application group, predefined applications, service level agreement (SLA), and/or schedule.

Figure 5:
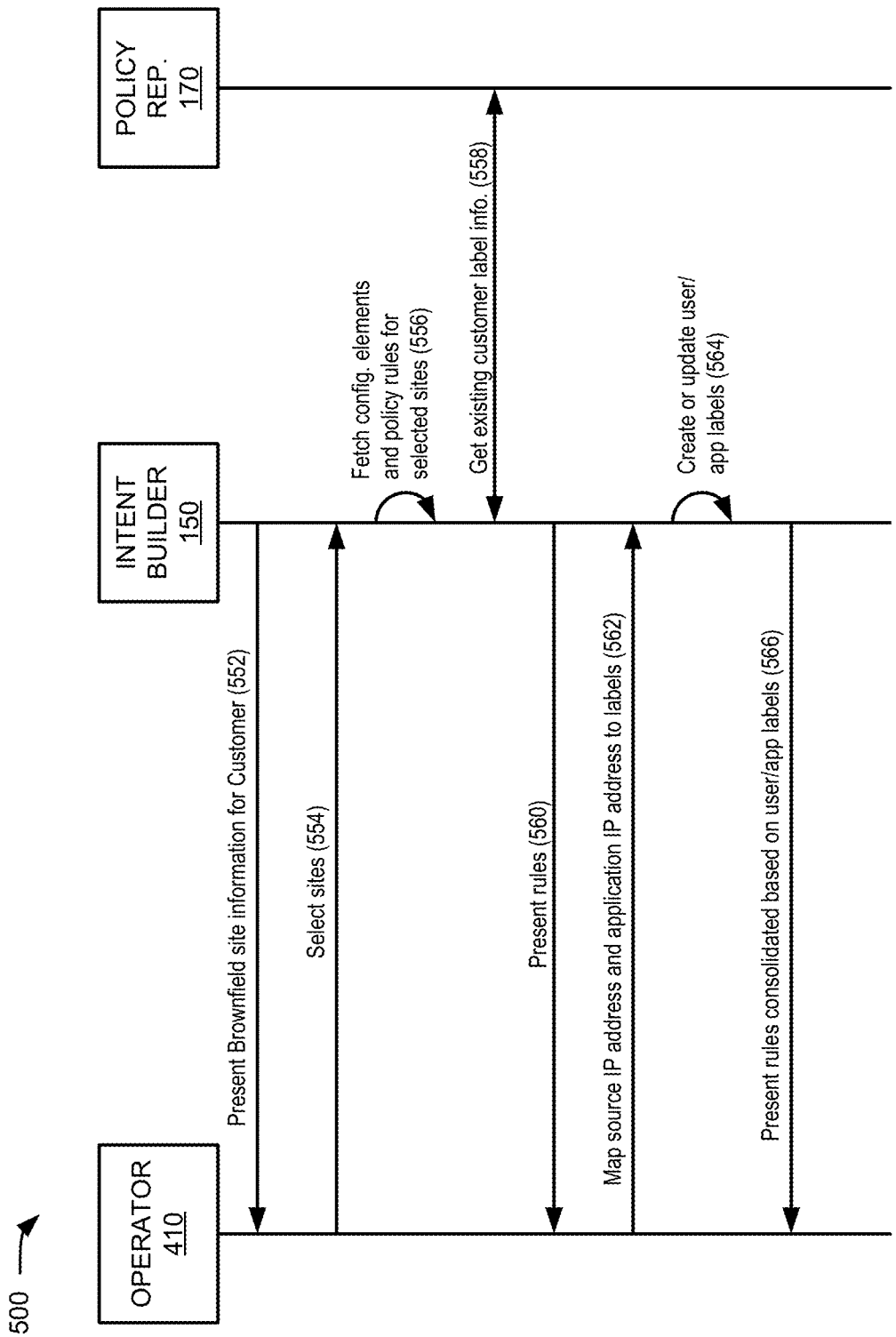
FIG. 5 is a diagram illustrating exemplary communications for building intents, according to an implementation described herein.

FIG. 5 is a diagram illustrating exemplary communications for building intents in a portion 500 of network environment 100. As shown in FIG. 5, network portion 500 may include an operator 410, intent builder 150, and policy repository 170. Communications in FIG. 5 may be described in the context of exemplary user interfaces shown in FIGS. 6A-6C. Interfaces in FIGS. 6A-6C may represent interactive screens that may be presented to operator 410 (e.g., on user device 180) via portal 140.

Figure 6A:
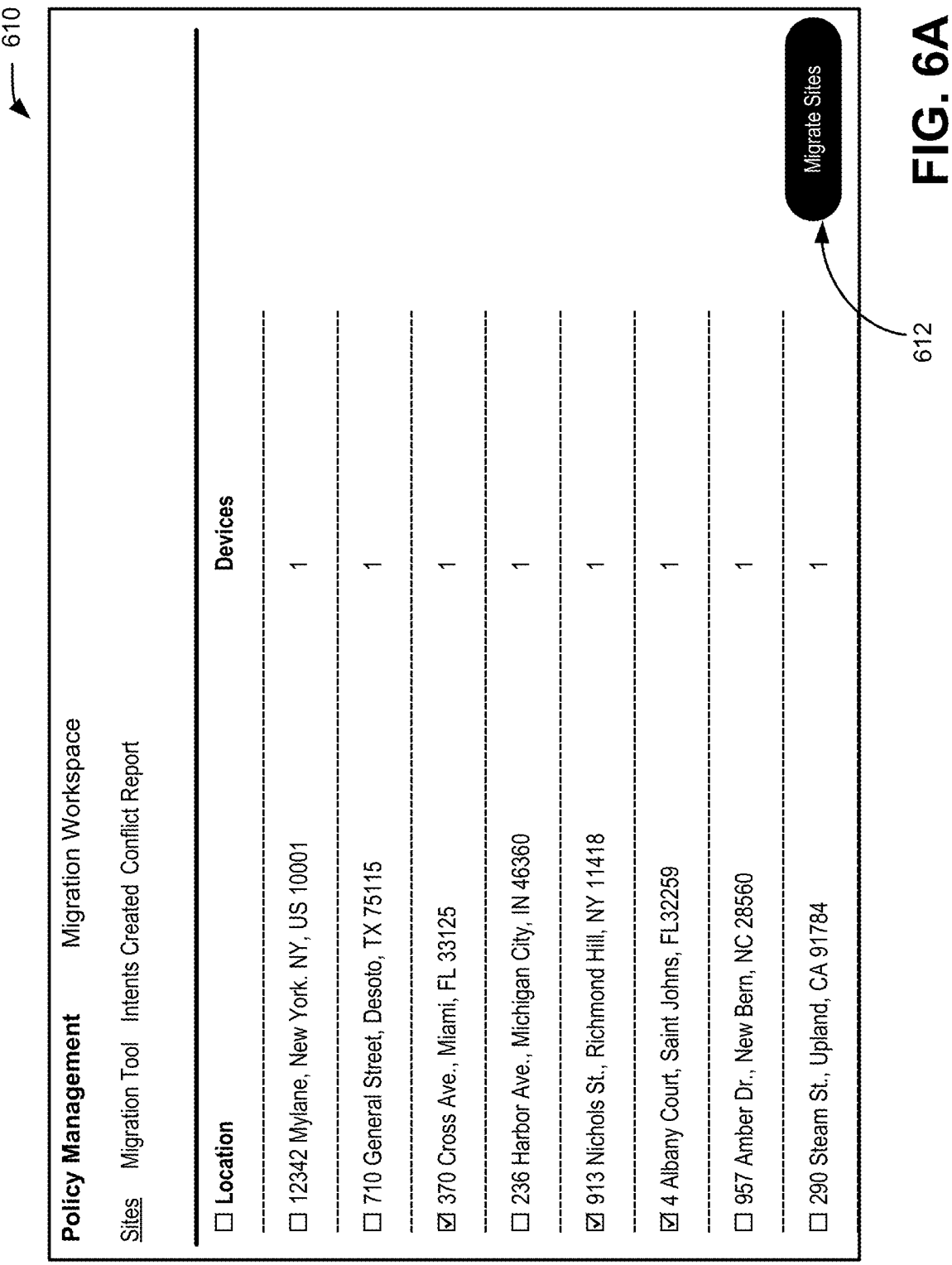
FIGS. 6A-6C are exemplary user interfaces that may correspond to the communications of FIG. 5.

Communications in FIG. 5 generally represent communications to develop consolidated rules using an off-line process based on user input for customer intent. FIG. 5 may provide simplified illustrations of communications in network portion 500 and is not intended to reflect every signal or communication exchanged between devices/functions. As shown at reference 552, intent builder 150 may present to operator 410 (e.g., via portal 140) a list of customer sites that are available for selection. In response, operator 410 may select 554 the particular customer sites for which the customer wants to build intents. For example, as shown in FIG. 6A, intent builder 150 may provide a list of available sites to be presented on user interface 610. Operator 410 may provide user input (e.g., by selecting check boxes) to select individual sites, associated with the customer's enterprise network 130, for which to generate rules. Selecting the "Migrate Sites" button 612 on user interface 610 indicates the completed site selections to intent builder 150.

In response to receiving selected sites 554, intent builder 150 may retrieve the configuration elements and policy rules for the selected sites, as indicated at reference 556. For example, intent builder 150 may retrieve the relevant configuration elements obtained via request 456 of FIG. 4. Intent builder 150 may also retrieve (e.g., from policy repository 170) existing label information, if any, as indicated by reference 558. For example, intent builder 150 may inquire from policy repository 170 if an operator has created previous labels for NF instances 138 in any of the selected sites.

Figure 6B:
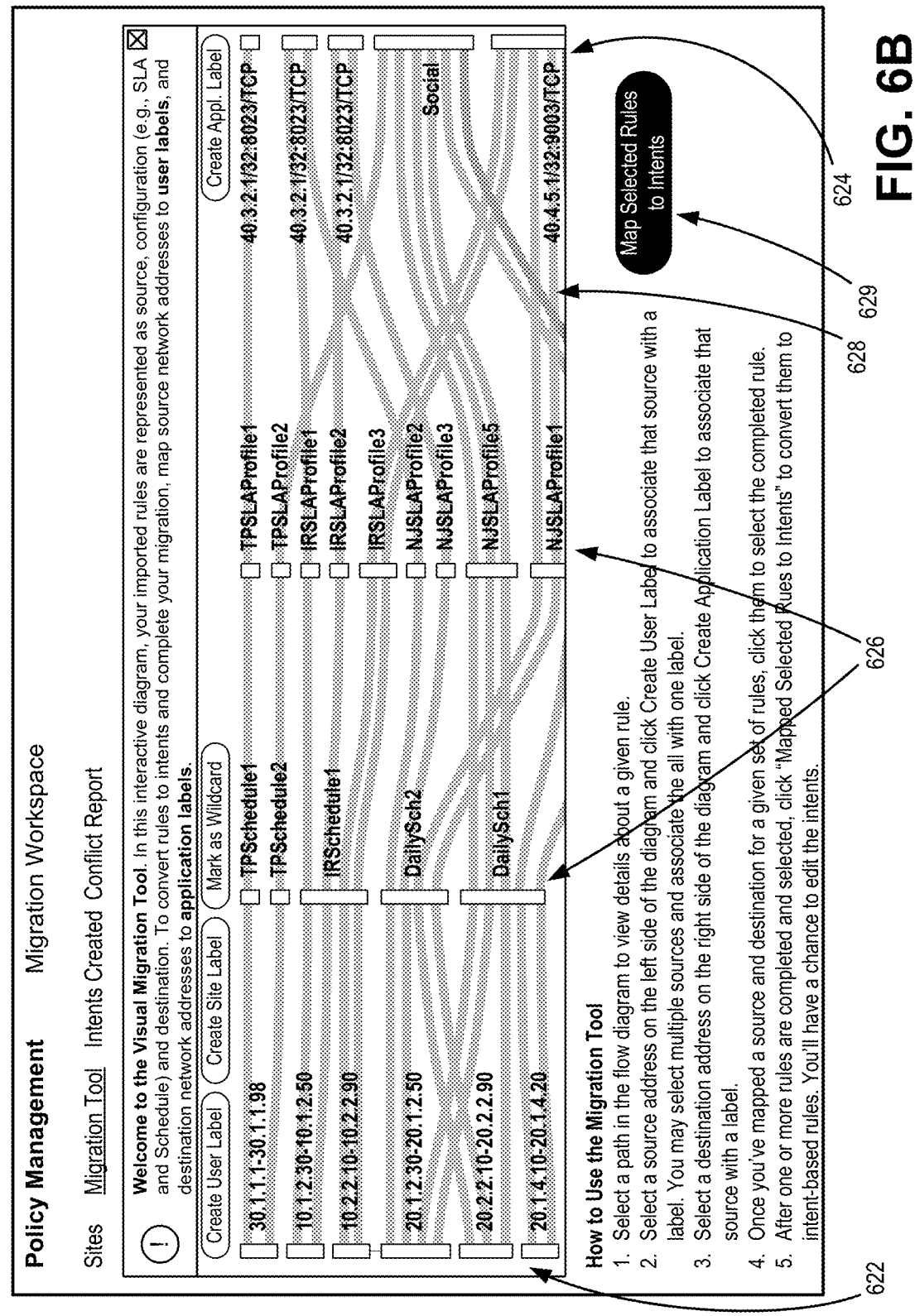
Figure 6C:
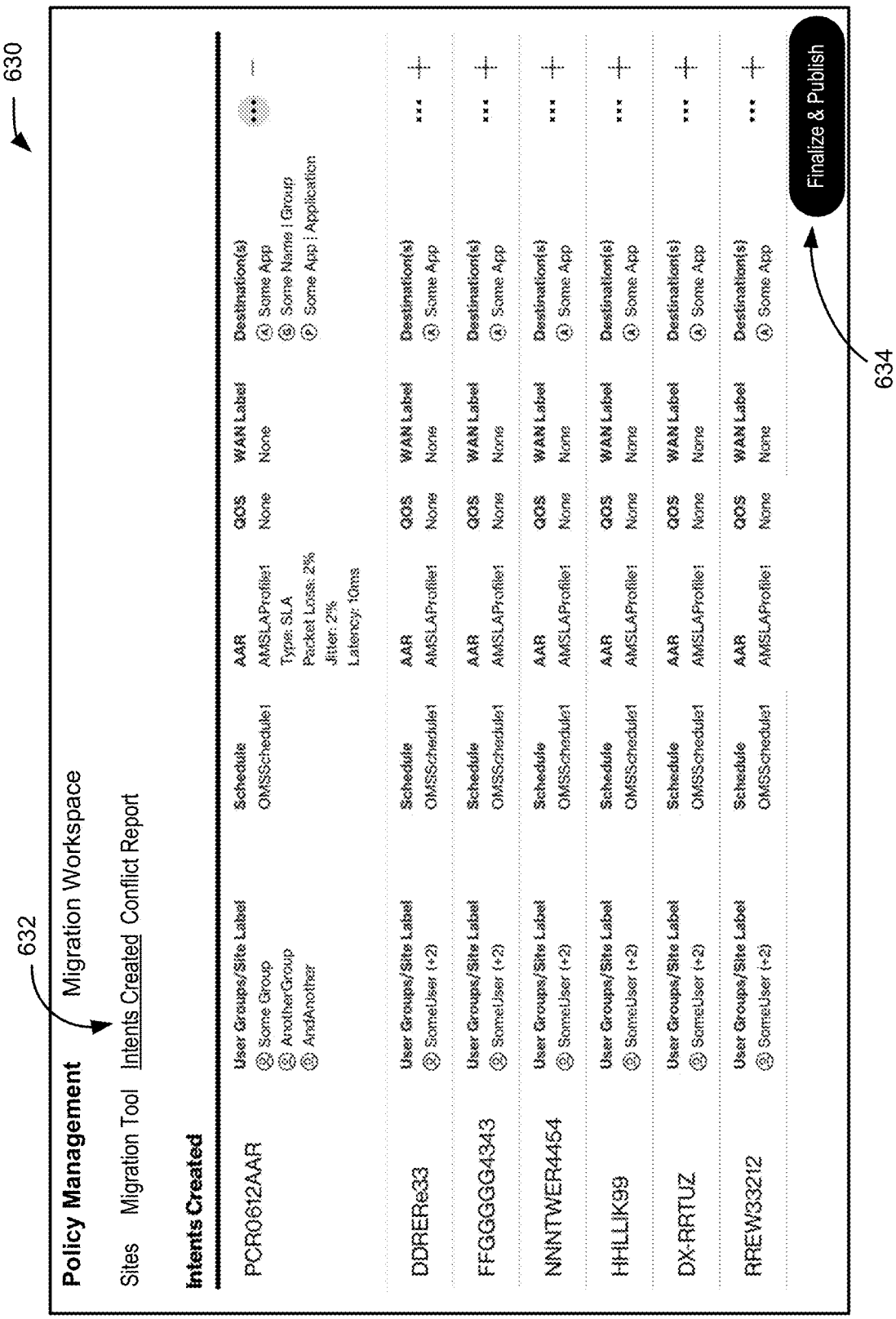

Based on the retrieved configuration elements, policy rules, and existing labels, intent builder 150 may present rules to the operator, as indicated by reference 560. For example, using the API 462 from FIG. 4, intent builder 150 may present (via portal 140) the rules grouped by VPN, application group/predefined apps, and/or SLA and Schedule object. In one example, as shown in FIG. 6B, intent builder 150 may provide for the selected sites a user interface 620 including a flow diagram. The flow diagram may include implementation nodes, including a list of source addresses 622, a list of destination addresses 624, interconnected by different configuration elements 626. In the example of FIG. 6B, a path 628 (graphically represented by a connected group of nodes) between a source address and a destination address represents a rule. According to an implementation, each path 628 may include a link or rollover state that indicates a rule path from start (e.g., at one of source addresses 622) to finish (e.g., at one of destination addresses 624). Similarly, both source addresses 622 and destination addresses 624 may include a link or rollover state that shows additional detail for the respective node.

The operator may review the rules and, as indicated at reference 562, may map the source IP address and destination IP address to labels. For example, operator 410 may map a source IP address to either an existing user label or to a new user label. Similarly, operator 410 may map the destination IP address (e.g., an application IP address) to an application label. In one implementation, referring again to FIG. 6B, nodes (e.g., one or more of source addresses 622 and destination addresses 624) may be selected by an operator to add user labels, such that addresses may be mapped to the user labels. After a path 628 has been associated with a source label (e.g., for one of source addresses 622) and a destination label (e.g., for one of destination addresses 624), the path 628 may be selected. If at least one path is selected, the "Map Selected Rules to Intents" button 629 on user interface 620 may be used to send the path selections to intent builder 150 for conversion to intent-based rules.

Referring back to FIG. 5, intent builder 150 may receive the mapped source IP addresses and application IP addresses. In response, as shown at reference 564, intent builder 150 may create or update user and application labels. For example, intent builder 150 may update a local database and/or policy repository 170 with the update labels.

Intent builder 150 may use labels to intelligently derive policies needed for the customer at each site. For example, based on a recommended profile derived from the user/application labels, intent builder 150 may provide default policies, such as a security policy, for inspection by the user. In other implementations, the default policy may include, for example, a firewall policy, an SD-WAN policy, or the like, that can be implemented by network devices 120 for enterprise network 130. In another implementation, intent builder 150 may provide a comprehensive group of policies that relate to selected labels selected by a user. As shown at reference 566, intent builder 150 may present operator 410 with consolidated policies based on the user labels and application labels. In one implementation, referring to FIG. 6C, after the user maps one or more rules (e.g., via user interface 620), intent builder 150 may present an "intents created" tab 632 of user interface 630 that can be selected by a user (e.g., operator 410). Intents created tab 632 may present an editable list of policy rules.

Operator 410 may review the default policies and decide whether to accept, edit, or reject. If the user determines that default policy is not acceptable, the user can modify default policy to create a custom policy. The accepted default policy or the created custom policy may be selected for deployment when the user selects a "Finalize and Publish" button 634 on user interface 630. As described further below, deployment may include, for example, validating the intents and providing the policy to applicable network devices 120 that can enforce the policy on applicable sites across enterprise network 130.

Figure 7:
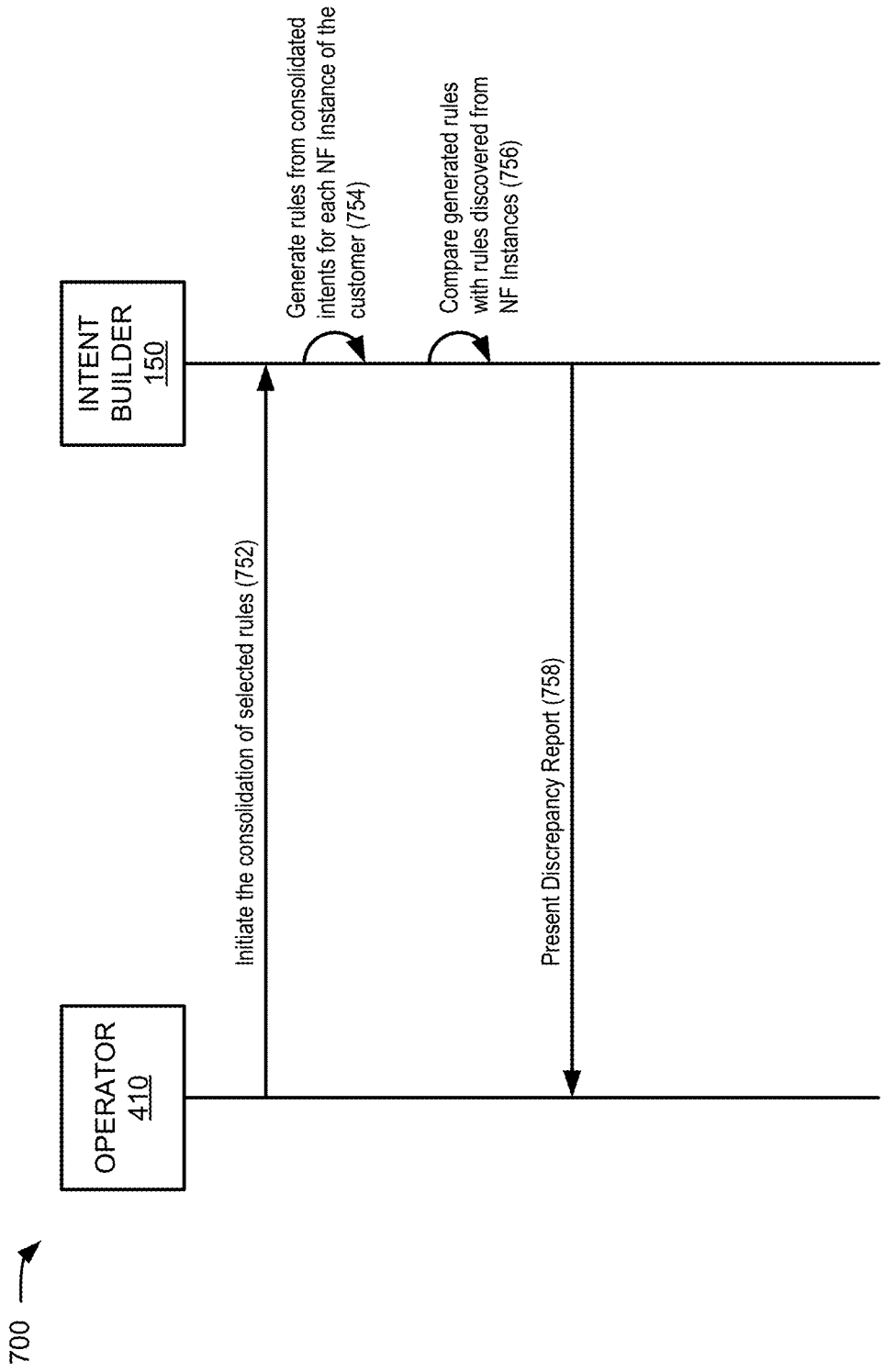
FIG. 7 is a diagram illustrating exemplary communications for analyzing intent matches, according to an implementation described herein.

FIG. 7 is a diagram illustrating exemplary communications for performing an intent match analysis in a portion 700 of network environment 100. As shown in FIG. 7, network portion 700 may include operator 410 and intent builder 150. Communications in FIG. 7 may be described in the context of exemplary user interfaces shown in FIGS. 8A and 8B. Interfaces in FIGS. 8A and 8B may represent interactive screens that may be presented to operator 410 (e.g., on user device 180) via portal 140.

Communications in FIG. 7 generally represent communications to validating intents using an off-line process. FIG. 7 may provide simplified illustrations of communications in network portion 700 and is not intended to reflect every signal or communication exchanged between devices/functions. As shown at reference 752, operator 410 may initiate the consolidation of the selected rules. For example, user selection of the "Finalize and Publish" button 634 on user interface 630 described above may cause intent builder 150 to initiate validation procedures.

Upon receiving the initiate consolidation signal from operator 410, intent builder 150 may generate rules from the consolidated intents for each NF instance of the customer, as indicated at reference 754. For example, intent builder 150 may receive the "to be applied configuration" with customer-specific, vendor-agnostic policy information saved by the user. Intent builder 150 may use information from vendor registrations to pull vendor-specific data for particular NF instances 138. For example, intent builder 150 may match registered categories and features of specific NF instances 138 to categories and requirements from the "to be applied configuration." Intent builder 150 may confirm site information, NF instance information, and customer information and create rules for vendor-specific micro-service (VSMS) instance for the customer.

Intent builder 150 may compare the generated rules with rules previously discovered from NF instances 138, as indicated at reference 756. For example, intent builder 150 may compare rules generated at reference 754 with active rules (e.g., policy configuration) obtained from configuration elements in FIG. 4 (reference 456) to determine if there are discrepancies between the generated policy configuration and a discovered policy. Examples of discrepancies may include identifying a rule in the policy framework that is not found in the controller or identifying a rule in the controller that is different than a rule with the same label in the controller. Intent builder 150 may generate a discrepancy report 758 for presentation to operator 410.

Figure 8A:
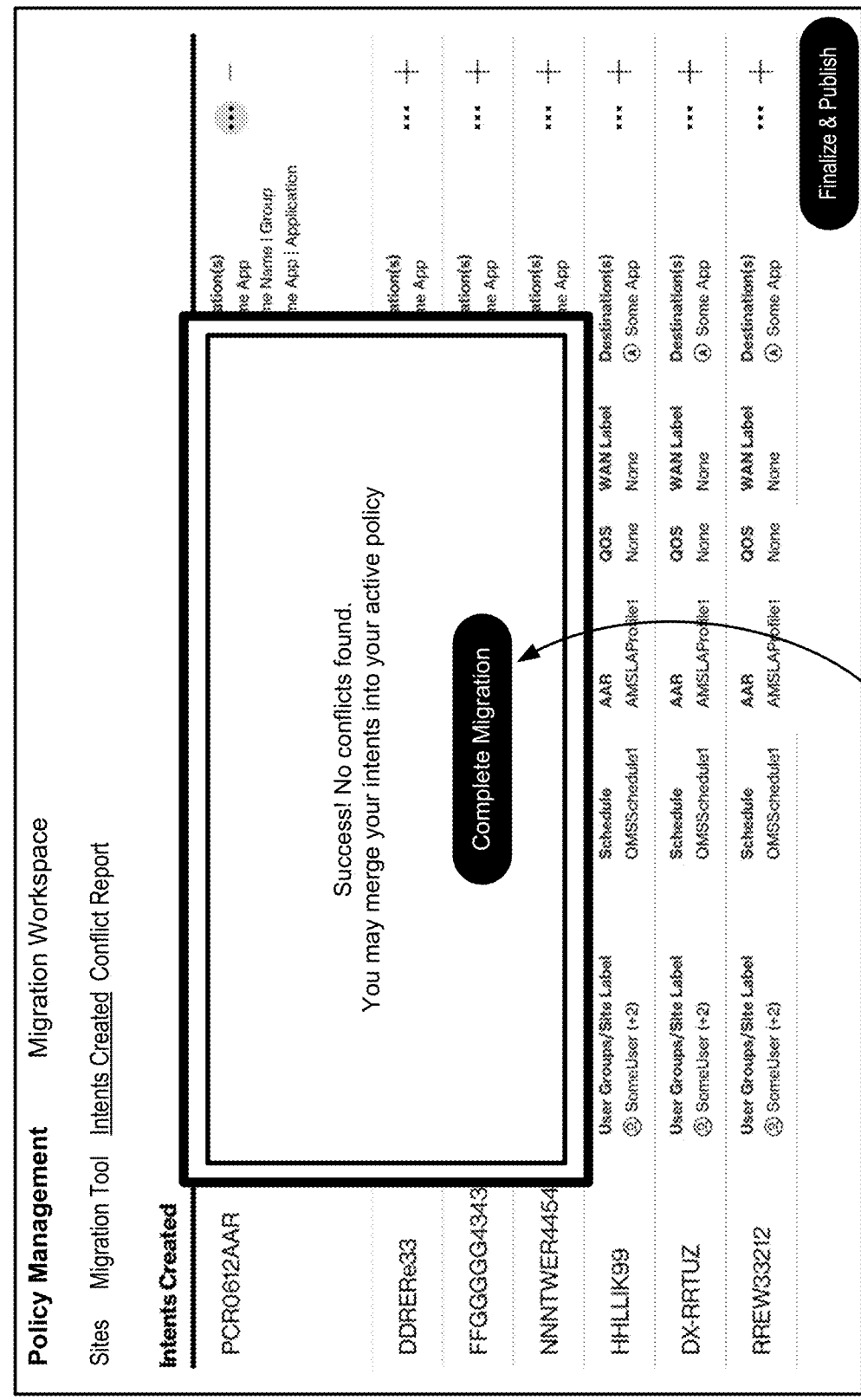
Figure 8B:
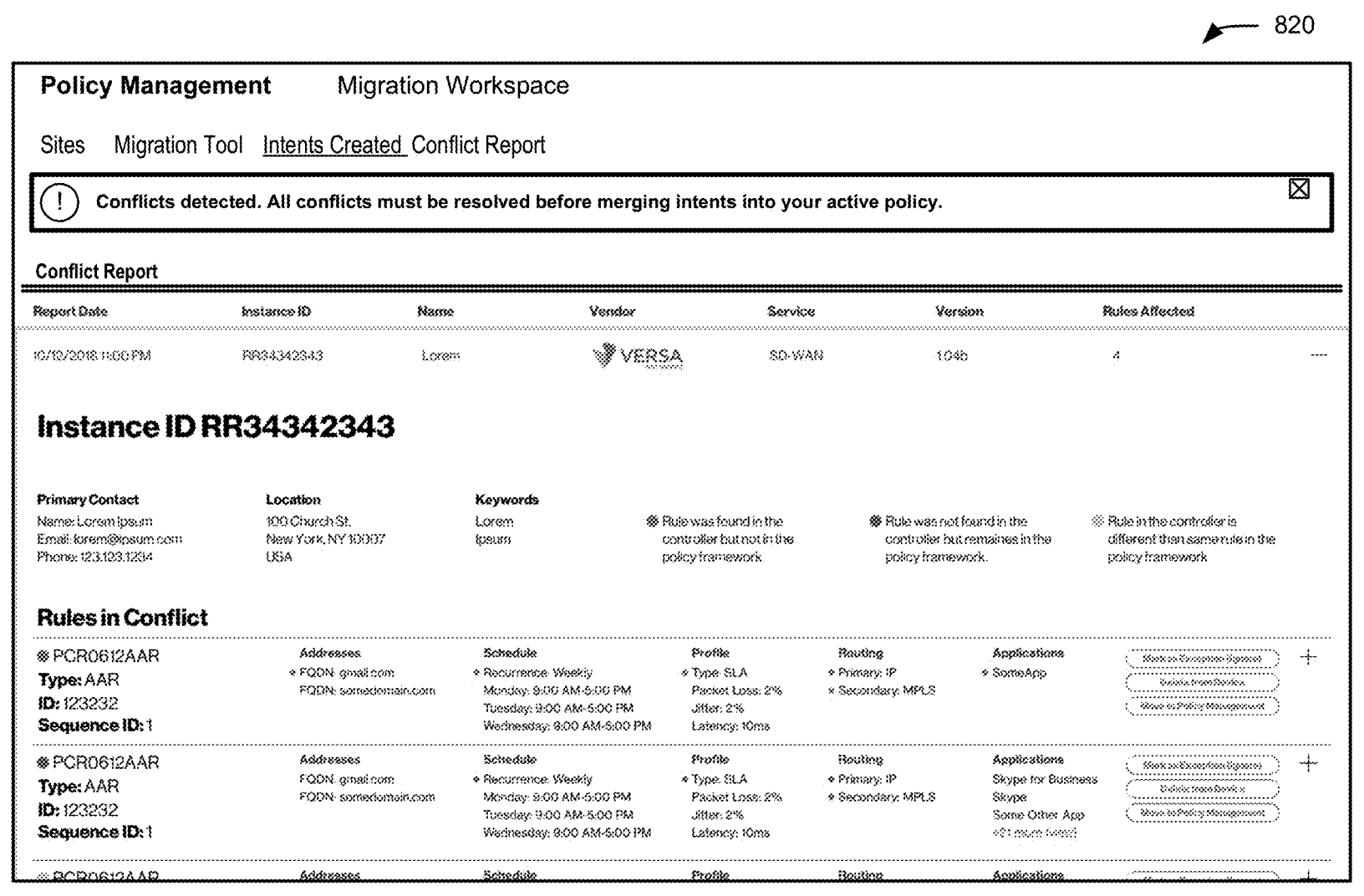

Depending on the above comparison results, discrepancy report 758 may include, for example, an indication of discrepancies or no discrepancies. For example, as shown in FIG. 8A, if no discrepancies are found, intent builder 150 may present operator 410 with user interface 810 including a "Complete Migration" button 812. Additionally, or alternatively, intent builder 150 may present operator 410 with an option to download a configuration to file for offline processing. Alternatively, as shown in FIG. 8B, if discrepancies are found, intent builder 150 may present operator 410 with user interface 820 including a list of discrepancies where there are inconsistencies between the generated policy configuration and a discovered policy.

Figure 9:
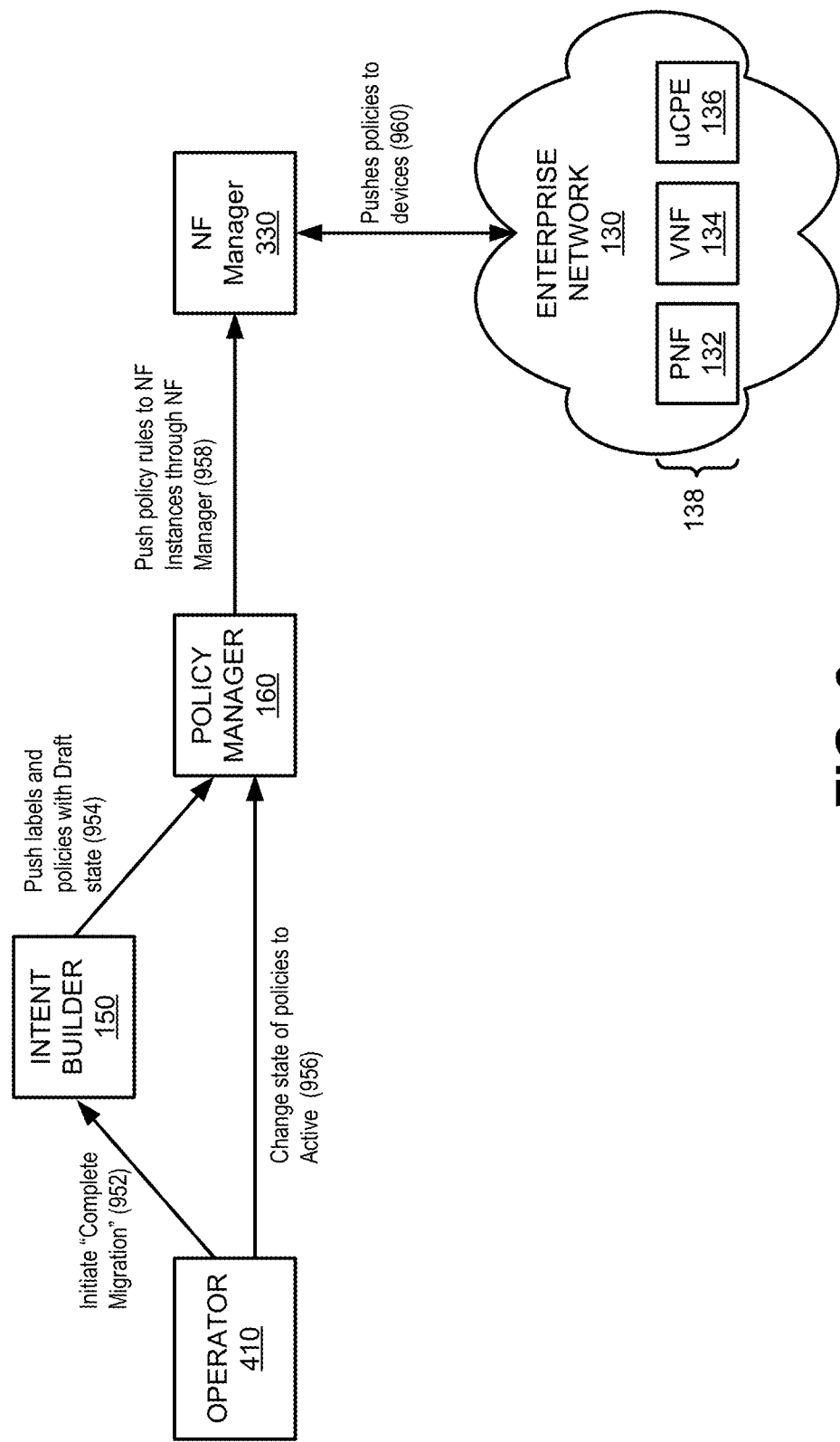
FIG. 9 is a diagram illustrating exemplary communications for transferring constructed intents, according to an implementation described herein.

FIG. 9 is a diagram illustrating exemplary communications for transferring constructed intents in a portion 900 of network environment 100. As shown in FIG. 9, network portion 900 may include operator 410, NF manager 330, intent builder 150, and policy manager 160. Communications in FIG. 9 generally represent communications to transfer constructed intents to devices in an enterprise network. FIG. 9 may provide simplified illustrations of communications in network portion 900 and is not intended to reflect every signal or communication exchanged between devices/functions.

As shown at reference 952, an operator may initiate a policy migration 952. For example, an operator 410 may select "Complete Migration" button 812 from user interface 810 of FIG. 8A. Upon receiving the signal to initiate a policy migration, intent builder 150 may push labels and polices to policy manager 160, as shown at reference 954. Policy manager 160 may hold the labels and polices until the operator 410 provides a signal to change the state of the policies to "active," as shown at reference 956. Upon receiving the active signal, policy manager 160 may push 958 the policy rules to the NF instances 138 through NF manager 330, and NF manager 330 may push 960 the policies to individual devices/functions in enterprise network 130.

Figure 10:
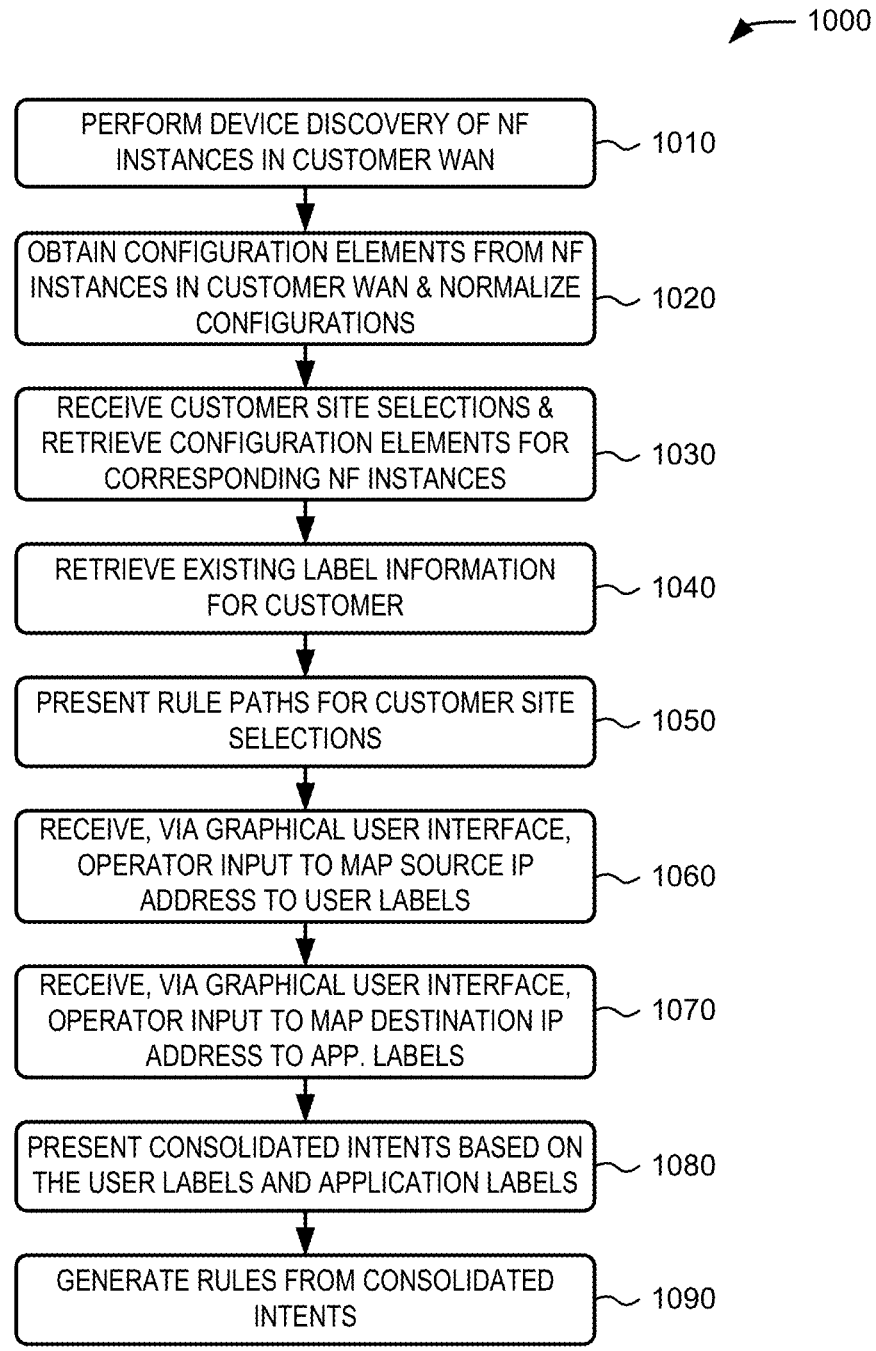
FIG. 10 is a flow diagram illustrating an exemplary process for building intents using a policy management system, according to an implementation described herein.

FIG. 10 is a flow diagram illustrating an exemplary process 1000 for building intents using a policy management system, according to an implementation described herein. In one implementation, process 1000 may be implemented by intent builder 150. In another implementation, process 1000 may be implemented by intent builder 150 in conjunction with one or more other devices in network environment 100.

Process 1000 may include performing device discovery of NF instances in a customer WAN (block 1010), and obtaining configuration elements from NF instances in the customer WAN and normalizing the configuration elements (block 1020). For example, as described in connection with FIG. 3, intent builder 150 may receive inventory data for a customer's NF instances, obtain NF manager information for corresponding NF managers, determine whether inventoried devices are reachable, and generate a device discovery report. Also, as described in connection with FIG. 4, intent builder 150 may fetch configuration elements from each NF instance and provided an API for normalized configuration elements.

Process 1000 may also include receiving customer site selections and retrieving configuration elements for corresponding NF instances (block 1030), and retrieving existing label information for the customer (block 1040). For example, as described in connection with FIG. 5, intent builder 150 may use portal 140 to present brownfield site information from enterprise network 130 to operator 410 and receive site selections via, for example, user interface 610. As further described in connection with FIG. 5, intent builder 150 may use the customer selections to fetch (e.g., from a local memory or database) configuration elements and policy rules for selected sites and retrieve (e.g., from policy repository 170) existing customer label information.

Process 1000 may further include presenting rule paths for the customer site selections (block 1050), receiving operator input to map source IP addresses to user labels (block 1060), and receiving operator input to map destination IP addresses to application labels (block 1070). For example, intent builder 150 may generate and present rules to operator 410 via user interface 620, based on the retrieved configuration elements, policy rules, and existing labels. Intent builder 150 may receive operator input for user labels and application labels via user interface 620.

Process 1000 may additionally include presenting consolidated intents based on the user labels and application labels (block 1080), and generating rules from the consolidated intents (block 1090). For example, based on operator input to user interface 620, intent builder 150 may generate an editable list of consolidated intents, such as presented in user interface 630. Intent builder 150 may check for conflicts and provide a discrepancy report, as described in connection with FIG. 7. Once any discrepancies are resolved, intent builder 150 may push a draft version of the consolidated intents to policy manager 160 for deployment/publication.

Systems and methods described herein provide a network tool that discovers device configurations for selected enterprise sites and automatically organizes the data to assist users, so they can build intents for network function policies in enterprise networks. A network device performs device discovery of network function (NF) instances in a customer network; retrieves configuration elements from the NF instances; normalizes the configuration elements; and generates a graphical user interface with rule paths based on the configuration elements. The network device receives, via the graphical user interface, operator input to map source Internet protocol (IP) addresses in the rule paths to a user label and to map destination IP address in the rule paths to an application label. Based on the operator input, the network device presents, via the graphical user interface, consolidated intents and generates vendor-agnostic policy rules from the consolidated intents.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 10, and message/operation flows with respect to FIGS. 3-5, 7, and 9, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   retrieving policy rules for network function (NF) instances in an enterprise network;
   presenting, to a user, a graphical user interface including rule paths to represent the policy rules, wherein each of the rule paths includes a source Internet protocol (IP) address and a destination IP address interconnected by different configuration elements, wherein the configuration elements include policy rules for the NF instances;
   receiving, from the user, a first user input to:
      map the source IP addresses in the rule paths to a user label, and
      map the destination IP addresses in the rule paths to an application label;
   presenting consolidated intents based on the user label and the application label; and
   generating policy rules from the consolidated intents.

2. The method of claim 1, further comprising:
   presenting site selection options for the enterprise network; and
   receiving a second user input to select particular sites from the site selection options.

3. The method of claim 1, further comprising:
   generating the consolidated intents based on the first user input.

4. The method of claim 1, further comprising:
   performing device discovery of the NF instances in the enterprise network.

5. The method of claim 4, wherein performing device discovery of the NF instances includes determining whether each of the NF instances is reachable via a NF manager.

6. The method of claim 1, wherein the NF instances include:
   a physical network function (PNF),
   a virtual network function (VNF), or
   universal customer premises equipment (uCPE).

7. The method of claim 1, further comprising:
   storing, by one or more devices in a provider network, the different configuration elements.

8. The method of claim 1, further comprising:
   comparing the vendor-agnostic policy rules with an active policy configuration for the NF instances;
   presenting differences between an active policy configuration and a change to a network policy; and
   generating a discrepancy report based on the comparing.

9. A computing device, comprising:
   one or more processors configured to:
      retrieve policy rules for network function (NF) instances in an enterprise network;
      present, to a user, a graphical user interface including rule paths to represent the policy rules, wherein each of the rule paths includes a source Internet protocol (IP) address and a destination IP address interconnected by different configuration elements, wherein the configuration elements include policy rules for the NF instances;
receive, from the user, a first user input to:
map the source IP addresses in the rule paths to a user label, and
map the destination IP addresses in the rule paths to an application label;
present consolidated intents based on the user label and the application label; and
generate policy rules from the consolidated intents.

10. The computing device of claim 9, wherein the one or more processors are further configured to:
present site selection options for the enterprise network; and
receive a second user input to select particular sites from the site selection options.

11. The computing device of claim 9, wherein the one or more processors are further configured to:
generate the consolidated intents based on the first user input.

12. The computing device of claim 9, wherein the one or more processors are further configured to:
perform device discovery of the NF instances in the enterprise network.

13. The computing device of claim 12, wherein, when performing device discovery of the NF instances, the one or more processors are further configured to:
obtain a network address for an NF manager associated with each of the NF instances; and
determine whether each of the NF instances is reachable via the NF manager.

14. The computing device of claim 9, wherein the NF instances include:
a physical network function (PNF),
a virtual network function (VNF), or
universal customer premises equipment (uCPE).

15. The computing device of claim 9, wherein the one or more processors are further configured to:
store, in a provider network, the different configuration elements from the NF instances.

16. The one or more computing devices of claim 9, wherein the one or more processors are further configured to:
compare the vendor-agnostic policy rules with an active policy configuration for the NF instances;
present differences between an active policy configuration and a change to a network policy; and
generate a discrepancy report based on the comparing.

17. A non-transitory computer-readable medium containing instructions executable by at least one processor of a network device, the instructions configured for:
retrieving policy rules for network function (NF) instances in an enterprise network;
presenting, to a user, a graphical user interface including rule paths to represent the policy rules, wherein each of the rule paths includes a source Internet protocol (IP) address and a destination IP address interconnected by different configuration elements, wherein the configuration elements include policy rules for the NF instances;
receiving, from the user, a first user input to:
map the source IP addresses in the rule paths to a user label, and
map the destination IP addresses in the rule paths to an application label;
presenting consolidated intents based on the user label and the application label; and
generating policy rules from the consolidated intents.

18. The non-transitory computer-readable medium of claim 17, wherein the instructions are further configured for:
presenting site selection options for the enterprise network; and
receiving a second user input to select particular sites from the site selection options.

19. The non-transitory computer-readable medium of claim 17, wherein the instructions are further configured for:
generating the consolidated intents based on the first user input.

20. The non-transitory computer-readable medium of claim 17, wherein the instructions are further configured for:
comparing the vendor-agnostic policy rules with an active policy configuration for the NF instances;
presenting differences between an active policy configuration and a change to a network policy; and
generating a discrepancy report based on the comparing.

* * * * *